Sept. 25, 1923.
H. E. DUNN
FORM FOR CONCRETE STRUCTURES
Filed May 29, 1922
1,468,702
2 Sheets-Sheet 1
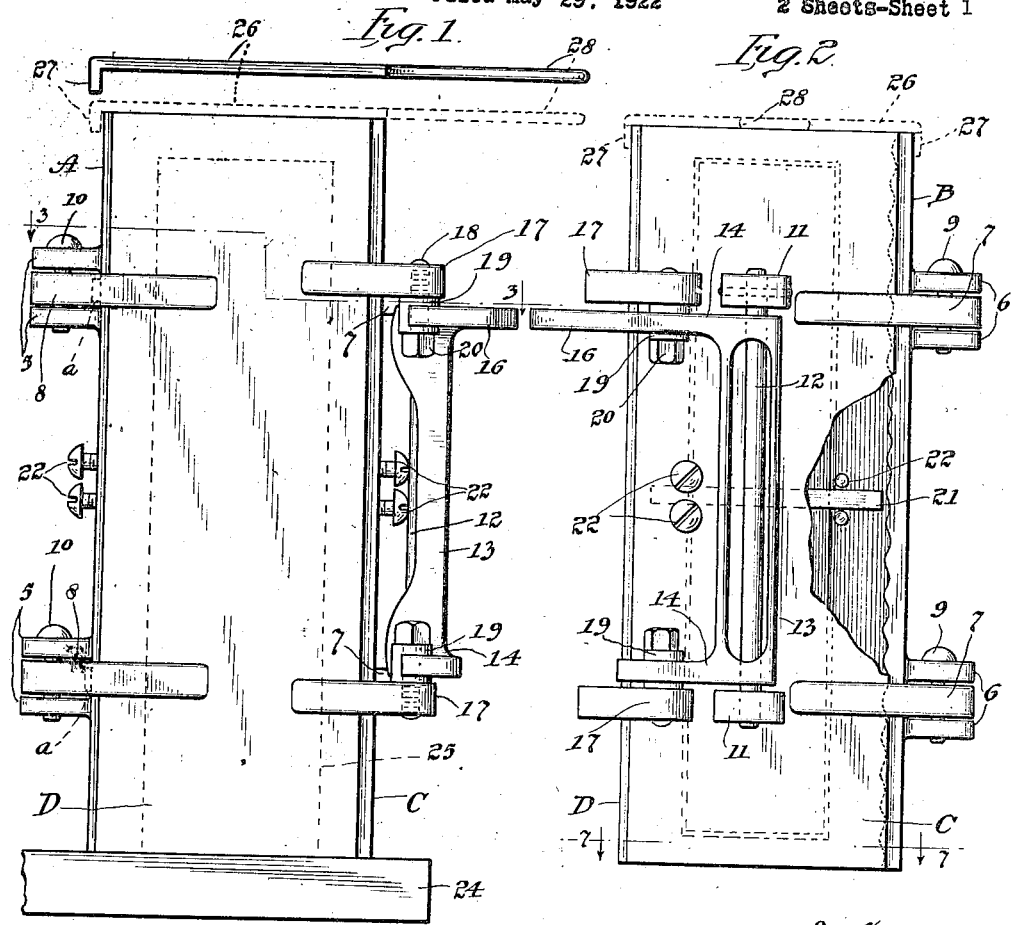
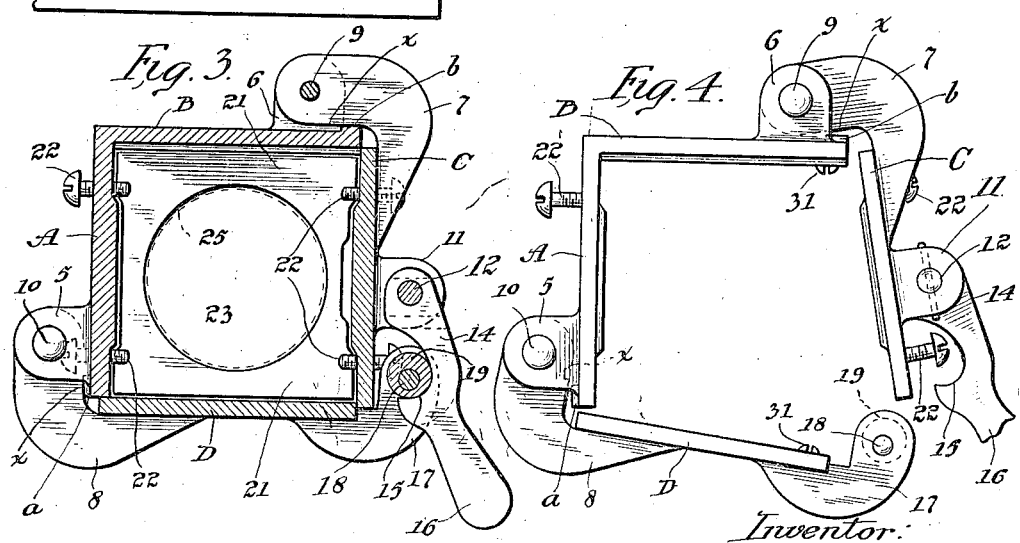
Inventor:
Harry E. Dunn
By Benjamin, Roodhouse & Lundy
Attys.

Sept. 25, 1923.
H. E. DUNN
1,468,702
FORM FOR CONCRETE STRUCTURES
Filed May 29, 1922
2 Sheets-Sheet 2
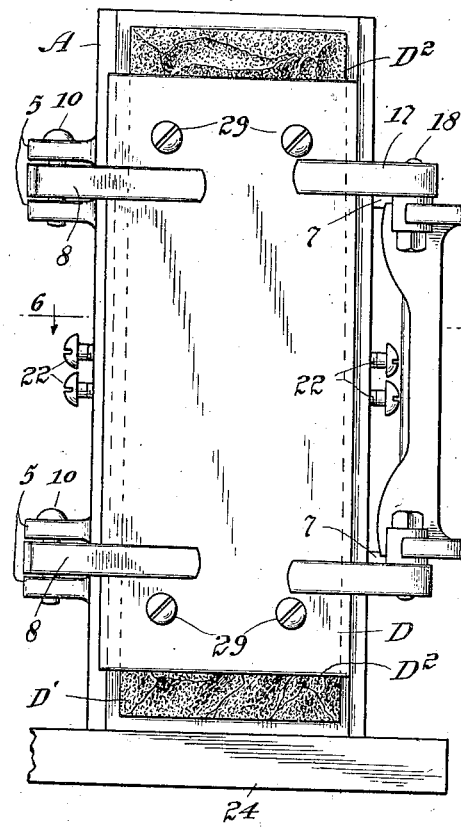
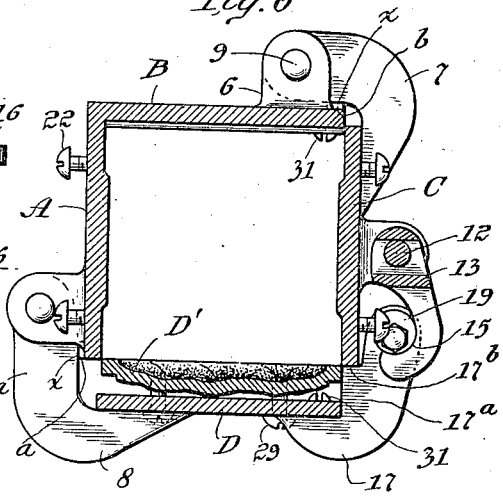
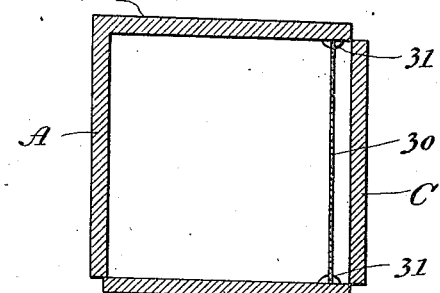
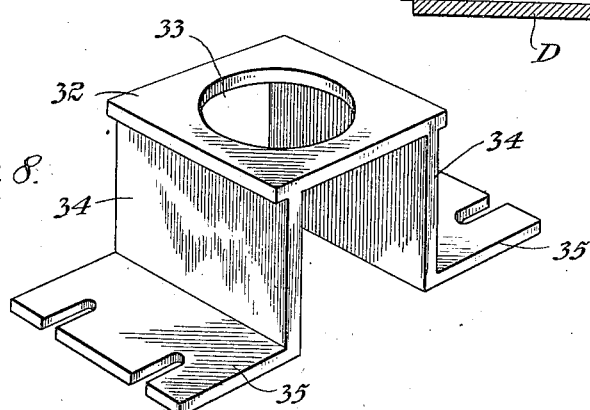
Inventor:
Harry E. Dunn
By Benjamin, Roodhouse & Lundy
Attys.

Patented Sept. 25, 1923.

1,468,702

UNITED STATES PATENT OFFICE.

HARRY E. DUNN, OF HOLLAND, MICHIGAN, ASSIGNOR TO W. E. DUNN MANUFACTURING COMPANY, OF HOLLAND, MICHIGAN, A CORPORATION OF MICHIGAN.

FORM FOR CONCRETE STRUCTURES.

Application filed May 29, 1922. Serial No. 564,534.

*To all whom it may concern:*

Be it known that I, HARRY E. DUNN, a citizen of the Dominion of Canada, residing at Holland, in the county of Ottawa and State of Michigan, have invented a new and useful Improvement in a Form for Concrete Structures, of which the following is a specification.

My present invention relates to a form or mold for the making of concrete structures, such as tile, building blocks, and the like.

Among the divers objects of my invention are the provision of a form or mold that may be readily used in conjunction with a machine for automatically fabricating the tile, building block, etc., having a bore or central opening, preferably longitudinally therethrough. In this connection, I have provided a form or mold that is readily separable for the convenient removal of the completed structure after the same has been removed from the machine or apparatus. I have also constructed this device in a manner so that provision is made for the fabrication of two half-length tiles, blocks, etc., in a single form, and have also provided means whereby a tile, block, etc., for use at the corner of a building, or similar structure may be conveniently made without removing the article from the form until it has been "set" sufficiently to avoid its becoming distorted after removal.

In the fabrication of tile, building blocks, etc., of rectangular cross-section, it is obvious that the faces should be parallel upon opposite sides and adjacent faces should be precisely at true right angles to each other; in other words the reentrant angle formed by the meeting of one face with each adjoining face should be exactly ninety-degrees. However, it frequently occurs in assembling the several parts of a form or mold that the adjoining walls vary slightly from the ninety degree angle, and I have therefore devised a novel structure wherein this inadvertence or defect may be quickly overcome in a simple and effective manner. I have also provided a unique latching device in connection with the separable or hinged form or mold which will insure the walls of the mold being firmly clamped in relation to each other, and which may be readily adjusted for the purpose of taking up wear or "play" between the parts.

I prefer to carry out my invention in substantially the manner hereinafter fully described, and as more particularly pointed out in the claims, reference being made to the accompanying drawings that are, in a sense, merely schematic for the purpose of illustration, and disclose a typical or preferred embodiment of my invention.

In the drawings:

Fig. 1 is a vertical side elevation of my invention, and

Fig. 2 is a similar view of a face or wall thereof at a right angle to Fig. 1.

Fig. 3 is a transverse horizontal section of the structure taken on the line 3—3, Fig. 1.

Fig. 4 is a top plan of my invention with the latch released and the hinged walls slightly opened.

Fig. 5 is a vertical side elevation of my form showing the use of a supplementary plate for making a rock face.

Fig. 6 is a transverse section thereof on line 6—6, Fig. 5.

Fig. 7 is a transverse section on line 7—7, Fig. 2 showing the manner of using a removable wall for providing a tapestry, tinted, or other facing upon the finished block or tile.

Fig. 8 is a perspective of a shelf for use in forming shorter end-blocks in order to "break joints" in walls.

In the drawings, for the purpose of convenience, similar reference characters have been employed to designate the same parts throughout the several views, and by referring, first, to Figs. 3 and 4, it will be seen the structure preferably comprises two elongated rectangular shaped walls A and B that are permanently and integrally jointed to each other along their meeting longitudinal edges so as to be disposed in planes at right angles to each other in transverse section. Adjacent the longitudinal edges, opposite the joined edges, walls A and B are, respectively, provided with parallel pairs of ears 5 and 6. The movable walls C and D are hingedly connected to walls A and B by upper and lower hinge brackets 7 and 8 extending from the respective walls, brackets 7 of wall C being positioned at their lateral ends between ears 6 and pivotally assembled therewith by pins 9 while the lateral ends of brackets 8 are similarly positioned between ears 5 and pivotally assembled therewith by pins 10. As will be seen in Figs. 3 and 4, hinge brackets 7 and 8 are substantially L-shaped so that they will extend around the corners of the junctures of walls B and C and walls A and D so that when the form is closed and locked the inner edges $x$ of the lateral members of said brackets are disposed substantially parallel with the adjacent faces of walls A and B (Fig. 3). Embossments $a$ are made upon the outer surface of wall A between each pair of ears 5, and similar embossments $b$ are made at corresponding locations upon wall B, and I prefer to position said embossments $a$ and $b$ at the adjacent edges of the respective walls so as to be spaced from the pins 9 and 10. When walls C and D have been closed and locked the edges of hinge brackets 7 and 8 will contact the adjacent portions of the respective embossments $b$ and $a$, and should the walls be found to be distorted from a true right angle the embossments may be either built up or reduced in thickness to permit of a trueing of the walls, as will be understood.

Extending laterally outwardly from wall C is a pair of spaced ears 11 that are transversely bored to receive a vertically disposed rod 12 upon which a latch member is hingedly mounted. This latch member comprises a substantially U-shaped casting, the connecting portion 13 thereof being milled out to reduce its weight and is bored longitudinally to receive rod 12, and is positioned between ears 11, as seen in Fig. 2 of the drawings. The horizontally disposed lateral and parallel arms 14 of the U-shaped latch member have hook-shaped recesses or notches 15 in their inner edges to engage their respective latching elements, and the upper arm is slightly longer than the lower arm to provide a hand-grasp 16 by which the structure is operated in the well-known manner. Suitable substantially L-shaped lugs 17 extend transversely and horizontally out from the outer vertical edge of wall D adjacent latch arms 14, and upon the outer portions of the lateral members of these lugs are provided vertically alining pins 18 that extend towards each other from facing surfaces of said lugs and have mounted thereon eccentrically bored sleeves 19 that are adjustably secured thereon by suitable nuts 20 screwed upon the threaded extended ends of said pins 18. These sleeves are engaged by notches 15 of the latching member carried by wall C, and in the event of wear or "play" occurring between these latching elements nuts 20 may be loosened and the eccentric sleeves rotated slightly upon the pins, and the nuts again tightened so that a tighter grip will be had between the latching members.

Whenever it is desired to make half blocks, a suitable partition plate 21 is placed intermediate the top and bottom of the form and positioned and supported between oppositely arranged pairs of screws 22 tapped through opposite walls of the form, which screws when the structure is used for full length tile or blocks, are unscrewed slightly until their inner ends are flush with the inner surfaces of their respective walls. A central circular opening 23 is made in said plate so that the formation of the central bore of the tiles or blocks may be continued entirely through the form. I prefer to employ this before mentioned structure in connection with an automatic tile or block machine, such as that disclosed in United States Letters Patent issued November 9, 1915, No. 1,159,448 for a machine for making hollow tile, etc., in which machine there is provided a rotatable packer-head that is moved vertically or longitudinally through the form for shaping the tile, etc., and for forming the central bore therein. When partition plate 21 is used in connection with the form, the packer-head will pass up through central opening 23 therein and form the two half blocks or tiles. In order to fabricate a block or tile that may be used at the corner of a building structure where it would be undesirable to have the end of the bore of the tile exposed, I prefer to place the form and the packed cement, etc., upon a table 24 from which arises a standard or column 25 of shorter height than the height of the form and block, and I prefer that the standard of column 25 be of less diameter than the bore of the block and partition plate 21, as seen in Fig. 3 of the drawings. This will permit me to insert or position the block received from the automatic machine over column 25 and fill in the upper portion of the bore of the block with cement to close the end of said bore. A facing plate 26 having a flange or downturned lip 27 along one edge to facilitate the positioning thereof is placed upon the top of the form, as in Figs. 1 and 2, and struck with a mallet, or the like, while held in position by the operator grasping the extended handle 28 of said plate. The form and block may shortly thereafter be removed from the column and the block permitted to set before unlatching and removing the form.

If desired, the interior faces of walls or plates A, B, C and D may be provided with embossments or undulations for the purpose of forming suitable recesses or flutings upon the corresponding surfaces of the finished tile or block; such formation upon the walls being indicated in Figs. 2, 3 and 4 of the drawings. I do not, however, limit myself to walls having these specific configurations as the structure may obviously be modified without departing from the principles set forth in the appended claims.

When, however, it is desired to give the block an imitation rock or stone face a matrix plate D', having the desired irregular depressions upon its inner surface, is secured to wall D by screws 29, as shown in Fig. 5, or in any other suitable manner, and wall D is reduced, as at D², to clear the usual "wearing ring" in which the form is mounted on the table or platform of the automatic machine hereinbefore mentioned. In order to accommodate matrix plate D' the lateral members of hinge brackets 8 are elongated slightly, as at 8ᵃ (Fig. 6), as are the corresponding members 17ᵃ of the L-shaped latch lugs 17 which provide shoulders 17ᵇ on the latter which abut or contact the adjacent edge of wall C when the form is closed and locked, similar to the operation of the device as illustrated in Fig. 3.

Other styles of facing, such as tapestry, tinted stucco etc., may be made upon the block by the use of a removable sheet-metal wall 30 temporarily supported within the form by means of bifurcated lugs or embossments 31 extended inwardly upon facing portions of the opposite walls B and D, and adjacent the outer vertical edges thereof. These lugs or embossments 31 are in vertical alinement with each other at the top and bottom edges of the respective walls B and D so that the sheet metal wall 30 may be removed vertically from the form after the facing material has been deposited between it and wall C (with which it is parallel) and the remaining portion of the form has been filled with the material for forming the block.

In laying blocks in tiers it is desirable to "break joint" in the well-known manner, and for the purpose of providing a block for the corner which will be the proper size for this purpose I employ a temporary shelf, such as illustrated in detail in Fig. 8, which, as seen, is of substantially U-shape, the shelf portion 32 being rectangular in outline and having a central opening 33 through which the packer-head of the automatic machine above mentioned is adapted to pass. The parallel arms of the U-shaped casting provide standards or supports 34 that elevate shelf 32 the desired distance above the platform or table of the machine, and said standards are spaced a distance less than the width of the shelf so that the latter overhangs or projects beyond the same to insure the proper disposition of walls A and B, C and D of the form when the latter is telescoped over the shelf structure. Slotted lateral or horizontal flanges 35 act as feet at the bottoms of standards 34 and permit of the securing of the device to the platform of the automatic machine by bolts and nuts, or cap-screws the shanks of which enter the slots in said flange.

From the foregoing it will be seen I have provided a structure that may be effectively employed in the fabrication of blocks or tiles of divers lengths and having a variety of finishes upon the surfaces to be exposed to view, and I have also provided a form that may be readily trued to insure accurate angles at the corners of the finished product and which may be effectively and quickly locked or unlocked whenever it is desired. While I have herein disclosed the preferred manner of carrying out my invention it is obvious that changes may be made to accommodate the device to other structures, and I therefore desire it understood that all such modifications are fully contemplated as coming within the scope of the appended claims.

What I claim is:

1. A form for concrete and like structures comprising a plurality of walls hingedly connected together, a hook-shaped latch member pivotally carried by one of said walls, and an element adjustable upon an eccentric axis carried by an adjacent wall and coactable with the hook-shaped latch member.

2. A form for concrete and like structures comprising a plurality of walls hingedly connected together, a hook-shaped latch member pivotally carried by one of said walls, and means coactable with said latch member and having a portion thereof arranged to be adjusted eccentrically.

3. A form for concrete and like structures comprising a plurality of walls hingedly connected together, a hook-shaped latch member pivotally carried by one of said walls, a stud carried by an adjacent wall and extended laterally of the path of movement of said latch member, and a collar eccentrically adjustable on said stud and adapted to be engaged by the hooked portion of said latch member.

4. A form for concrete and like structures comprising an integral right angular member, walls hingedly connected to the outer portions of said member and movable with relation thereto, a hook-shaped latch member pivotally carried by one of said hinged walls, and an eccentrically adjustable element carried by the opposited hinged walls and coactable with the latch member to retain said hinged walls in closed position.

5. A form for concrete and like structures comprising a pair of walls integrally formed at right-angle to each other, walls co-acting with the edges of said integral walls, and hinged devices connecting said last-named walls to said first-named walls; said devices each consisting of a substantially L-shaped bracket projecting from an edge of its wall and having its lateral member terminating in juxtaposition to the adjacent wall and pivotally connected thereto, whereby an edge of said bracket is brought into contact with said adjacent wall to position the wall carrying said bracket in predetermined position relative to said adjacent wall when the form is closed.

6. A form for concrete and like blocks comprising a plurality of walls hingedly connected together to provide a hollow structure when closed, a removable partition dividing the interior of the form into opposite chambers, and retractable means carried by said walls for supporting and positioning said partition.

7. A form for concrete and like blocks comprising a plurality of walls hingedly connected together to provide a hollow structure when closed, a removable partition dividing the interior of the form into opposite chambers, and oppositely arranged screws tapped through said walls to support and position said partition; said screws adapted to be redrawn to flush with the interior face of said walls when said partition is not in use.

8. A form for molding plastic material comprising a plurality of panels, means for pivotally connecting said panels comprising L-shaped brackets integral with certain of said panels, pivots connecting said brackets to adjacent panels, and projecting stops upon said adjacent panels; said stops co-operating with said pivots and brackets to control the relative positioning of the respective panels.

9. A form for molding plastic material comprising a plurality of walls, means for pivotally connecting said walls comprising L-shaped brackets integral with certain of said walls, pivots connecting said brackets to adjacent walls, projecting stops upon said adjacent walls and co-operating with said hinge elements to position the respective walls, and latching devices carried by other adjacent walls; said devices provided with shoulders arranged to abut the edges of adjacent opposite walls when said form is closed.

10. A form for molding plastic material comprising a plurality of walls hingedly connected together to provide a hollow structure when closed, one of said walls being of less length than the remaining walls and spaced from the edges of adjacent walls when closed, means for retaining said walls in closed position, and a removable matrix wall carried by said spaced wall and adapted to engage the edges of adjacent walls when the form is closed.

11. A form for molding plastic material comprising a plurality of walls hingedly connected together to provide a hollow structure when closed, one of said walls being of less length than the remaining walls and spaced from the edges of adjacent walls when closed, means for retaining said walls in closed position, and a removable matrix wall carried by said wall and adapted to engage the edges of adjacent walls when the form is closed.

12. In combination with a form for molding plastic material, a shelf comprising a substantially U-shaped structure the horizontal connecting portion overhanging at its opposite ends the parallel members of said structure and provided with a central aperture, and slotted lateral flanges extended from the lower ends of said parallel members.

Signed at Chicago, county of Cook, and State of Illinois, this 18th day of May, 1922.

HARRY E. DUNN.

Witnesses:
W. E. DUNN,
V. F. SANDY.